United States Patent
Ballman et al.

[11] 3,810,688
[45] May 14, 1974

[54] OPTICAL WAVEGUIDING DEVICES USING MONOCRYSTALLINE MATERIALS OF THE SILLENITE FAMILY OF BISMUTH OXIDES

[76] Inventors: Albert Anthony Ballman, 627 Lincoln Ave., Woodbridge, N.J. 07095; Ping King Tien, 19 Lisa Dr., Chatham, N.J. 07928

[22] Filed: May 21, 1973

[21] Appl. No.: 362,255

[52] U.S. Cl. ........ 350/96 WG, 350/147, 350/160 R
[51] Int. Cl. .............................................. G02b 5/14
[58] Field of Search .............................. 360/96 WG

[56] References Cited
UNITED STATES PATENTS
| | | | |
|---|---|---|---|
| 3,725,809 | 4/1923 | Ulrich et al. | 350/96 WG X |
| 3,736,045 | 5/1973 | Heidrich et al. | 350/96 WG X |
| 3,764,195 | 10/1973 | Blank et al. | 350/96 WG |

*Primary Examiner*—John K. Corbin
*Attorney, Agent, or Firm*—Wilford L. Wisner

[57] ABSTRACT

Monocrystalline materials of the sillenite family of bismuth oxides are used in the fabrication of optical thin-film devices. The sillenite materials are cubic in crystalline structure, transparent in the visible and near-infrared portions of the spectrum, electro-optic, piezoelectric, optically active, have useful acoustic surface wave coefficients and can be grown into high quality optical thin films by heteroepitaxial growth techniques. This wide range of properties in the light-guiding monocrystalline film should prove useful in the fabrication of a variety of thin-film devices suitable for integrated optical circuit arrangements. One such device is disclosed employing a thin light-guiding sillenite film upon which is deposited a pair of interdigital electrodes. The device serves as a thin-film electro-optical switch and modulator for a guided light beam.

10 Claims, 2 Drawing Figures

OPTICAL WAVEGUIDING DEVICES USING MONOCRYSTALLINE MATERIALS OF THE SILLENITE FAMILY OF BISMUTH OXIDES

BACKGROUND OF THE INVENTION

This invention relates to thin-film optical waveguiding devices and, more particularly, to the use of monocrystalline sillenite bismuth oxide compositions in the fabrication of such devices.

As discussed in the article by S. E. Miller in Volume 48 of the *Bell System Technical Journal*, page 2059 (1969), future high capacity optical communications systems will consist of a variety of passive and active integrated optical circuit devices which function to guide and manipulate information-carrying light waves. In the time since the publication of Miller's article, extensive research has been conducted on various thin-film optical waveguides and associated optical devices. These waveguides and devices are, in part, analogous to rectangular waveguides and associated devices of conventional lower frequency systems. The work in the field to date has revealed that the eventual success of the proposed optical systems depends largely upon the development of thin-film materials which have suitable optical transmission properties and which are suitable for the fabrication of devices involving the manipulation of guided waves.

Monocrystalline thin-film materials have been found to be particularly attractive for integrated optics arrangements because generally they have low losses for the guided waves, are relatively simple and inexpensive to fabricate in the desired quality and form, and are well adapted to the production of active devices. Monocrystalline gallium arsenide-aluminum gallium arsenide systems, for example, have been the subject of considerable recent work in the field and have resulted in the production of a variety of potentially useful thin-film waveguiding structures, lasers, and modulators. See, for example, Volume 20 of *Applied Physics Letters*, page 36 (1972).

More recently, it has been shown that various monocrystalline synthetic garnet materials are ideally suited for integrated optics use. In Volume 22 of *Applied Physics Letters*, page 394 (1972), it was reported that a thin light-guiding film of magnetic garnet material can be used in the production of an efficient thin-film magneto-optical switch and modulator having a size and form compatible with proposed integrated optical systems. The excellent magnetic garnet films used in this work have opened new possibilities of thin-film magneto-optical devices.

In spite of these recent developments, monocrystalline materials suitable for use in optical thin-film devices are still relatively scarce. Gallium arsenide and the various garnets represent two of the very few monocrystalline film materials available in which practical thin-film devices have been demonstrated. There exists a continuing need in the art for new high quality monocrystalline materials suitable for use as passive and active elements in proposed optical systems.

SUMMARY OF THE INVENTION

We have discovered a promising new class of monocrystalline materials ideally suited for use in the production of both passive and active thin-film optical waveguiding devices.

In accordance with our invention, an optical waveguiding device is comprised of a thin film of a transparent sillenite bismuth oxide material formed on a substrate also of a transparent sillenite bismuth oxide material of lower index of refraction than that of the film. The sillenite materials used in these devices are selected from about 10 acentric compounds which crystallize in a body centered cubic structure of point group 23 and range in composition from pure $Bi_2O_3$ to compounds of $Bi_2O_3$ in varying ratios with $GeO_2$, $SiO_2$, $TiO_2$, $ZnO$, $Ga_2O_3$, $Al_2O_3$, $Fe_2O_3$, $B_2O_3$ and $P_2O_5$. Bismuth germanate of the formula type $6Bi_2O_3\cdot GeO_2$ is exemplary. High quality monocrystalline sillenite films having excellent overall optical guiding properties have been grown on lower index sillenite substrates by heteroepitaxial growth techniques. The films have a thin dimension approximating the wavelength of the radiation to be propagated therein in a guided mode parallel to the plane of the film.

According to a specific feature of the invention, the sillenite materials are shown to possess a wide range of properties which should prove useful in the production of a variety of active thin-film optical devices. Specifically, the sillenite materials are shown to possess useful electro-optic coefficients and acoustic surface wave coefficients, Faraday rotation, and to be piezoelectric, optically active, optically nonlinear and photoconducting. The thin-film devices we have produced with the sillenite materials are believed to be the first ever to possess all of these desirable properties.

In an illustrative embodiment of the invention, a thin-film electro-optical switch and modulator is described. The device employs a light-guiding sillenite film upon which is deposited a pair of interdigital electrodes. By properly selecting the spacing between the electrodes and the applied voltage, a spatially periodic variation in the refractive index of the film can be induced which serves to convert TE polarization modes to TM polarization modes, or vice versa, in the film. Passing the guided beam through a thin-film polarizer allows one to modulate the intensity of the beam by varying the voltage applied to the electrodes.

BRIEF DESCRIPTION OF THE DRAWING

A more complete understanding of the foregoing and other features and advantages of the invention can be obtained from the following detailed description taken with reference to the accompanying drawing in which.

DETAILED DESCRIPTION

The Figures

Figure 1:
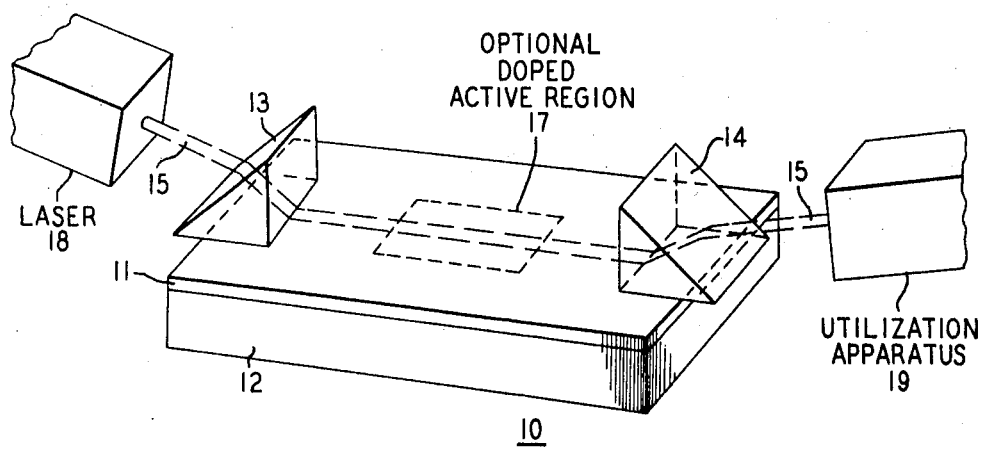
FIG. 1 is a perspective view of an embodiment of the invention.

In FIG. 1, thin-film optical waveguide 10 is shown in accordance with our invention consisting of film 11 of a transparent monocrystalline sillenite bismuth oxide material deposited on substrate 12 also of a transparent monocrystalline sillenite bismuth oxide material having a lower index of refraction than that of the film. Illustrative materials are bismuth germanate of the formula type $6Bi_2O_3\cdot GeO_2$ for substrate 12 and bismuth gallate of the formula type $12Bi_2O_3\cdot Ga_2O_3$ for film 11. Film 11 has a thickness approximating the wavelength of the electromagnetic radiation to be propagated therein, so that the radiation is effectively confined in that dimension by the dielectric discontinuities provided by the major surfaces of the film, i.e., the substrate/film and the air-space/film interfaces. For purposes of our invention, the thickness of film 11 may be anywhere within the range of 0.1 to 100 times the wavelength but is preferably between one and 10 times the wavelength. Propagation of the radiation in the two broad dimensions of film 11 is typically unrestricted.

Prism coupling means 13 and 14 are illustratively provided for introducing an extracting beam 15 of electromagnetic radiation in film 11. Beam 15 is illustratively coherent with a wavelength in the optical region of the electromagnetic spectrum (which includes visible as well as near-visible wavelengths), and may be provided by any suitable source, such as laser 18 of FIG. 1. Utilization apparatus 19 may be positioned to receive the extracted radiation. Also, means not shown can be provided for polarizing the incoming or outgoing beam in embodiments in which polarized waves are utilized.

The optical doped active region 17 of film 11 will be explained in a later section hereinbelow. It is noted that, for convenience of illustration, the elements shown in FIG. 1 are not drawn to scale or to relative dimensions.

The structure and operation of coupling prisms 13 and 14 are described in detail in Volume 14 of *Applied Physics Letters*, page 291 (1969). Other means are available for performing the same function. Optical coupling and decoupling can be accomplished, for example, by means of an optical grating formed on one of the major surfaces of film 11. Grating couplers, because of their lack of bulk, are desirable for integrated optical devices in which miniaturization and simplicity are important. A grating coupler is illustratively shown in the device of FIG. 2 of the drawing, the details of which are set forth in a later section hereinbelow. Thin-film grating coupling arrangements are discussed in U.S. Pat. No. 3,674,335, issued on July 4, 1972.

Composition and Preparation

As indicated above, the materials utilized in the embodiment of FIG. 1 are monocrystalline compositions of the sillenite family of bismuth oxides. As far as present studies reveal, the sillenite family includes approximately 10 acentric compounds ranging in composition from pure $Bi_2O_3$ to compounds of $Bi_2O_3$ in varying ratios with $GeO_2$, $SiO_2$, $TiO_2$, $ZnO$, $Ga_2O_3$, $Al_2O_3$, $Fe_2O_3$, $B_2O_3$ and $P_2O_5$. These materials are known to crystallize in a body-centered cubic structure of point group 23. See Volume 5 of *Applied Optics*, page 1688 (1966). Bismuth germanate of the formula type $6Bi_2O_3\cdot GeO_2$ is probably the best known member of the sillenite group.

Since the chemical and physical properties of the sillenite compounds depend upon the specific ions and ratio of ions of which they are composed, we have found that it is possible to select from a variety of possible sillenite compositions those particular thin-film and substrate materials which exhibit a refractive index relationship such that waveguiding can occur when a beam of radiation is excited in the film. Partial or complete substitution of various ions in the bismuth oxide system makes it possible to alter the refractive index of the film or substrate accurately and over relatively wide ranges. When grown by appropriate techniques, the monocrystalline sillenite thin films have been found to be substantially perfectly transparent in the visible and near-infrared portions of the spectrum with relatively low scattering and absorption losses for optically guided waves. The sillenite materials are thus ideally suited for use as passive waveguiding devices of the type illustrated in FIG. 1 of the drawing.

In addition to the foregoing properties, the sillenite materials have been shown to possess useful electro-optic coefficients and acoustic surface wave coefficients, Faraday rotation, and to be piezoelectric, optically active, optically nonlinear, and photoconducting. This wide range of properties in a high quality monocrystalline material should prove useful in the production of a variety of active thin-film devices suitable for use in existing and future optical systems. The thin-film guides that we have produced with the sillenite materials are believed to be the first ever to possess all of the useful properties mentioned above.

The fact that the sillenite materials are cubic in crystalline structure makes it possible to grow high quality thin films of the materials by heteroepitaxial growth techniques. Heteroepitaxial growth techniques have been developed largely for use in the production of high quality synthetic garnet films for magnetic bubble domain devices. One such heteroepitaxial growth technique useful for purposes of our present invention is described in detail in Volume 19 of *Applied Physics Letters*, page 486 (1971). The cubic crystalline system is most favorable for heteroepitaxy since there is only one lattice constant to match between the film and the substrate in the growth process. Liquid phase epitaxial (LPE) growth has been found to be preferred for the fabrication of devices in accordance with the invention. By taking advantage of the different melting points of the various members of the sillenite group (see Table I below), monocrystalline sillenite substrates can be dipped directly into melts of the desired film composition to form the various devices.

Table I sets forth in column 1 a list of the presently known compositions which constitute the sillenite family of bismuth oxides. The molecular ratios listed in column 2 of Table I are illustrative only and may be varied over wide ranges. Refractive index values are listed in column 4 only for those materials for which detailed index measurements have been made in our experiments to date. As explained below, the refractive index values may also be varied over wide ranges. Also listed in Table I are other physical and chemical properties of the various compounds of pertinence to the present invention.

TABLE I

| Composition | Ratio | Lattice Parameter Angstrom Units (A) | Index of Refraction | Melting Point °C |
|---|---|---|---|---|
| $Bi_2O_3\text{-}B_2O_3$ | 12:1 | 10.12 | — | 700 |
| $Bi_2O_3\text{-}SiO_2$ | 6:1 | 10.10 | 2.5424 | 900 |
| $Bi_2O_3\text{-}GeO_2$ | 6:1 | 10.14 | 2.5476 | 935 |
| $Bi_2O_3\text{-}TiO_2$ | 6:1 | 10.17 | 2.5619 | 930 |
| $Bi_2O_3\text{-}Ga_2O_3$ | 12:1 | 10.17 | 2.5798 | 825 |
| $Bi_2O_3\text{-}Al_2O_3$ | 12:1 | 10.16 | — | 930 |
| $Bi_2O_3\text{-}Fe_2O_3$ | 19:1 | 10.18 | — | 825 |
| $Bi_2O_3\text{-}ZnO$ | 6:1 | 10.20 | — | 800 |
| $Bi_2O_3\text{-}P_2O_5$ | 12:1 | 10.16 | — | 900 |

It will be noted by those skilled in the art that the index of refraction of any particular sillenite composition depends upon the particular material that is combined with the $Bi_2O_3$ and upon the ratio or relative amount of that material in the composition. For compositions with the same ratios, the higher the refractive index of the material combined with the $Bi_2O_3$, the higher the refractive index of the composition. Thus, $6Bi_2O_3$-$TiO_2$ has a higher refractive index than $6Bi_2O_3$-$SiO_2$ because $TiO_2$ has a higher refractive index than $SiO_2$. Also, increasing the ratio of the higher index material (or decreasing the ratio of the lower index material) in any particular sillenite composition increases the refractive index of that composition. Thus, $12Bi_2O_3$-$ZnO$ has a higher index of refraction than $6Bi_2O_3$-$ZnO$ since $Bi_2O_3$ has an index (~2.6) that is higher than that of ZnO (~2.0).

Consider, by way of example, the use of bismuth germanate, $6Bi_2O_3$-$GeO_2$, for substrate 12 in a thin-film device such as device 10 illustrated in FIG. 1. Bismuth germanate is a preferred substrate material for embodiments of our invention for several reasons. As Table I indicates, it has a lattice parameter that is nearly equal to the mean value for the entire sillenite group and consequently allows a relatively close match in that parameter with the other members of the group, a factor important for the epitaxial growth process. Bismuth germanate also has been grown in the past as a single crystal by conventional techniques in sizes and crystalline perfection which are adequate for purposes of our invention. Furthermore, bismuth germanate has the highest melting point of all of the sillenite compounds listed in Table I. In the LPE growth technique preferred for the present invention, a bismuth germanate substrate can thus be dipped directly into all compositions whose melting points are lower.

The selection of suitable film compositions for use in devices of our invention is determined primarily in that the film preferably has a higher index of refraction than that of the substrate. A close match in lattice parameter and thermal coefficient of expansion between the film composition and the substrate composition also insures that high quality crystalline epitaxy is obtained in the growth process. Several compositions listed in Table I satisfied these conditions in embodiments in which bismuth germanate is used as a substrate material. Particularly noted are $12Bi_2O_3$-$Ga_2O_3$, $6Bi_2O_3$-$TiO_2$, $19Bi_2O_3$-$Fe_2O_3$ and $6Bi_2O_3$-$ZnO$.

As indicated previously, the procedure and apparatus found to be preferred for epitaxial growth of sillenite films for the present invention is substantially identical to that previously reported for the growth of synthetic garnet films in Volume 19 of *Applied Physics Letters*, page 486 (1971). A few modifications may be noted, however. For the purposes of the present invention, the sillenite substrate is preferably dipped directly into a slightly supercooled melt of the actual film composition and not into a solution containing a flux to promote solubility, as is typically done in the garnet growth process referenced above. This step is possible with the sillenite materials because the melting point of the sillenite film composition can typically be selected to be lower than that of the sillenite substrate. This step also has the advantage of not introducing foreign ions into the melt which may tend to adversely affect the crystalline properties of the film by becoming locked in the film during the growth process.

The monocrystalline substrates used in our typical growth experiments can be either grown using conventional Czochralski pulling techniques or purchased from domestic suppliers where commercially available. The as-grown crystal boule sizes are typically about ¾ inch in width by about 3 inches in length. The crystals are typically first cut into wafers of approximately 1 millimeter in thickness. The wafers are then carefully polished to have smooth, flat and parallel surfaces. As in most epitaxial growth techniques, careful mechanical and chemical polishing of the substrate is important in the production of high quality epitaxial films which are smooth, uniform in composition and thickness, and impurity-free.

The polished substrate is then illustratively dipped directly into the supercooled melt of the desired film composition for approximately 30 minutes and is rotated at about 40 rpm during the film growth process. To obtain the supercooled melt, the film composition is first preferably heated to a temperature well above its melting point (e.g., to about 1,100°C) and held there for several hours in order to equilibrate the melt. The temperature of the melt is then gradually lowered below its melting point without inducing crystallization of the composition. The actual degree of supercooling of the melt (i.e., the number of degrees C below melting point that the melt is cooled without crystallization) to produce useful film growth depends upon the particular film composition being grown. Generally, the greater the degree of supercooling of the melt, the greater the rate of growth of the films. It has been our experience that the degree of supercooling permissible over which growth will occur without having nuclei formed on the surface of the melt is in the order of 5° to 10°C. Such a degree of supercooling produces film growth rates of the order of 1 to 2 microns of thickness per minute, a range which is consistent with reasonable crystalline quality.

In regard to the furnace used in the growth process, we have found that if the film growth is to be reasonably uniform over the entire surface of the substrate, it is best to have an isothermal zone in the furnace which is at least as long as the crucible used to contain the melt, and preferably longer. The temperature control equipment used for the furnace should be capable of maintaining the furnace at a given operating temperature within about ± 0.5° C.

Successive dippings of the substrate into the melt are preferably made by reheating the melt about 20°C above its nucleation temperature and then slowly cooling it back down to the dipping temperature. This procedure was found to produce more uniform growth rates than those typically obtained if repeated dippings were made into the same supercooled melt. This dipping procedure is continued until the desired epitaxial film thickness is achieved on the substrate.

EXAMPLES

Following the above-described procedure, a variety of structures of the type illustrated in FIG. 1 have been fabricated using various of the sillenite materials listed in Table I. As an example, thin epitaxial films of the following compositions were successfully deposited upon bismuth germanate substrates: $6Bi_2O_3$-$SiO_2$, $6Bi_2O_3$-$TiO_2$, $12BiO_2O_3$-$Ga_2O_3$, $6Bi_2O_3$-$ZnO$ and $12Bi_2O_3$-$Fe_2O_3$. The as-grown films generally appear to be milky in color and become clear after polishing. The films were found to be transparent, smooth, uniform in composition and thickness and free from impurities.

Of these various films, bismuth silicate, $6Bi_2O_3\text{-}SiO_2$, has an index of refraction lower than that of the bismuth germanate substrate and, consequently, waveguiding is not possible therein. Films of bismuth silicate on bismuth germanate substrates may nevertheless have uses other than optical waveguiding (e.g., arrangements which make use of their acoustic surface wave properties). All of the remaining films mentioned above are capable of forming optical waveguiding devices such as that illustrated in FIG. 1 on the bismuth germanate substrates based upon experimentally observed or calculated refractive index values.

Extensive optical experiments were carried out on various of the above-described structures. The experiments performed on structures comprised of a bismuth gallate, $12Bi_2O_3\text{-}Ga_2O_3$, film formed on a bismuth germanate substrate are exemplary. Light beams from a helium-neon laser (i.e., 0.6328 microns) and an argon-ion laser (i.e., 0.5145 or 0.4880 microns) were successively fed into one end of the bismuth gallate film using a rutile or gallium phosphide prism coupler such as that illustrated in FIG. 1. Because of the scattering of the light along the film surface, the guided waves propagating in the film appear as a bright streak extended along the film and could be photographed. Photographs of the film showed that the coupled light propagated through the entire film and then re-entered the air space at the opposite end of the film, leaving a bright spot at that point.

In a 1.73 micron thick bismuth gallate film, we observed two TE and two TM waveguide modes at the 0.6328 micron laser wavelength and three TE and three TM modes at the 0.5145 and 0.4880 micron laser wavelength. From the launching angles at the prism coupler, it was determined that the refractive indices of the bismuth gallate films were 2.5798, 2.6857, and 2.724, at the 0.6328, 0.5145 and 0.4880 micron laser wavelengths, respectively.

The lattice parameter mismatch in the bismuth gallate-bismuth germanate system described above is about 0.03 Å, with the larger lattice in the film. It may be noted that this mismatch is about twice the value that would be permissible for the growth of high quality garnet films. It is nevertheless believed that the flexibility of the $Bi^{+3}$ ion in the sillenite material both in coordination and radius permits good quality growth despite the large lattice difference. Moreover, the growth rates used in our preliminary experiments have been generally greater than about 1 micron of thickness per minute. It is anticipated that rates of the order of a few tenths of a micron per minute would produce films of higher degrees of crystalline, and consequently optical, quality. Lower growth rates can readily be achieved using lower degrees of supercooling of the melt (e.g., 1° to 2°C).

Figure 2:
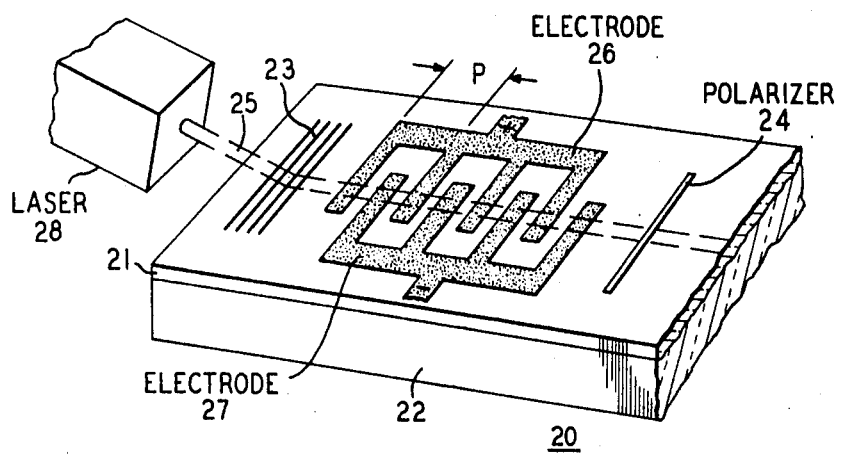
FIG. 2 is a perspective view of the thin-film electro-optical switch and modulator embodied in accordance with the invention.

To demonstrate the use of the sillenite materials in active thin-film devices, reference is made to FIG. 2 of the drawing. Shown in FIG. 2 is thin-film electro-opitcal switch and modulator 20, which is basically an electrical counterpart of the thin-film magneto-optical switch and modulator described in Volume 22 of *Applied Physics Letters*, page 394 (1972) and mentioned hereinabove.

Device 20 consists of sillenite thin film 21, which illustratively consists of bismuth gallate, formed on lower index sillenite substrate 22, which illustratively consists of bismuth germanate. Grating coupler 23 is used for coupling light beam 25 from laser 28 into film 21. Formed on the upper major surface of film 21 are interdigital electrodes 26 and 27. Electrodes 26 and 27 are illustratively formed of copper with the fingers of each electrode being connected to a common terminal (i.e., potential) and equally spaced from the fingers of the other electrodes. An external voltage source not shown is used to apply a potential difference across electrodes 26 and 27. By properly selecting the spacing between the adjacent fingers of electrodes 26 and 27 and the applied voltage, a spatially periodic refractive index variation is induced in film 21 which serves to convert TE polarization modes to TM polarization modes, or vice versa, in beam 25 through the electro-optic effect. Thin-film polarizer 24, which may simply comprise a thin strip of aluminum deposited on film 21, is then used to filter out one of the modes of beam 25 from film 21. Like those of FIG. 1, it is noted that the elements of FIG. 2 are not drawn to scale or to relative dimensions.

The period of the electric field induced in film 21 by interdigital electrodes 26 and 27 necessary to provide desired conversion of TE modes to TM modes is basically that which is necessary to match the wave velocities of the two modes in the film. For the fundamental ($m = o$) TE and TM modes, the period $P$ is given by the expression $P = \lambda / N_{TE_0} - N_{TM_0}$
where $\lambda$ is the free space wavelength of beam 25, $N_{TE_0}$ and $N_{TM_0}$ are the effective indices of refraction for the TE fundamental mode and the TM fundamental mode in film 21, respectively. For conversion of higher order $TM_m \to TE_m$ modes in film 21, the required period of the induced electric field can still be determined by the above formula by replacing $N_{TE_0}$ and $N_{TM_0}$ by $N_{TE_m}$ and $N_{TM_m}$, where $N_{TE_m}$ and $N_{TM_m}$ are respectively the effective refractive indices of the $m$th order modes.

Illustratively, laser 28 is a helium-neon laser supplying beam 25 of 0.6328 microns which is coupled using grating coupler 23 to propagate in film 21 in the TE ($m = o$) polarization mode. A portion of beam 25 is converted into the TM ($m = o$) mode after passing through the region of film 21 beneath electrodes 26 and 27, the amount of the conversion depending upon the voltage applied to the electrodes. Beam 25 then passes through the region of film 21 between thin-film polarizer 24 which illustratively absorbs the TM portion of the beam and freely passes the TE portion. One thus observes that the intensity of beam 25 after passing through polarizer 24 varies according to the voltage applied to electrodes 26 and 27.

Assuming bismuth gallate film 21 is 1.5 microns in thickness, $N_{TE_0}$ and $N_{TM_0}$ for the modes are numerically equal to 2.571193 and 2.570929, respectively. To match the difference in wave velocities between the two modes, the period $P$ of the electric field induced in film 21 by electrodes 26 and 27 should be $P = 0.6328$ microns/(2.571193 − 2.570929) or about 0.24 centimeters. This period amounts roughly to eight fingers per centimeter (four on each electrode) and a distance of about 0.12 centimeters between the adjacent fingers of electrodes 26 and 27. The bismuth gallate film has an electro-optic coefficient $r_{41} = 3.4 \times 10^{-10}$ centimeters per volt. It can thus be readily determined that if the electrodes cover 1 centimeter of the path of beam 25, an applied voltage of about 1,200 volts across the electrodes 26 and 27 is needed to convert the TE modes completely into the TM mode in film 21. With complete conversion of the modes, device 20 serves as an "on-off" switch for beam 25. By modulating the voltage applied to electrodes 26 and 27, one can efficiently modulate the intensity of beam 25 passing through polarizer 24.

Numerous variations and modifications of the embodiments described hereinabove will be realized by those skilled in the art without departing from the scope of the invention. For example, it is not intended to limit the invention to the use of bismuth germanate as a substrate material and the other specifically mentioned sillenite compositions as film materials in embodiments of the invention. All combinations of materials listed in column 1 of Table I above, including but not limited to those with the specific molecular ratios listed in column 2 of Table I, which satisfy the required refractive index relationship can be used in our invention. For example, the use of bismuth silicate, $6Bi_2O_3$-$SiO_2$, as a substrate allows one to use the materials $12Bi_2O_3$-$Ga_2O_3$, $12Bi_2O_3$-$Fe_2O_3$, and $6Bi_2O_3$-$ZnO$ as light-guiding film materials. Other compositions and combinations will be recognized by those skilled in the art. Other techniques for growing the films will also be recognized.

Additionally, it should be possible to obtain optical gain in the sillenite films of our invention as the light beams propagate therein. The sillenite film 11 of FIG. 1 may optionally include region 17 which is doped with a suitable concentration of active ion such as the neodymium ion (i.e., $Nd^{+3}$). Device 10 can thus serve both as a guide for an appropriate beam and as a thin-film amplifier.

We claim:

1. A thin-film device for guiding a beam of optical electromagnetic radiation of the type comprising a first body of an optically transparent material forming a substrate and, disposed on said substrate, a second body of optically transparent material having a higher refractive index than that of said first body, said second body having two substantially smooth major surfaces separated by a distance of the order of the wavelength of the radiation to be guided therein, and means for launching the beam into said second body in a guided mode propagating substantially parallel to said major surfaces, said device being characterized in that the materials of said first and second bodies are monocrystalline sillenite bismuth oxide compositions.

2. The device of claim 1 in which said monocrystalline sillenite compositions of said first and second bodies consist essentially of $Bi_2O_3$ and combined with said $Bi_2O_3$ at least one material selected from the group consisting of $GeO_2$, $SiO_2$, $TiO_2$, $ZnO$, $Ga_2O_3$, $Al_2O_3$, $Fe_2O_3$, $B_2O_3$ and $P_2O_5$.

3. The device of claim 2 in which the material of said first body is $6Bi_2O_3$-$GeO_2$ and the material of said second body is selected from the group consisting of $6Bi_2O_3$-$TiO_2$, $6Bi_2O_3$-$ZnO$, $12Bi_2O_3$-$Ga_2O_3$, and $12Bi_2O_3$-$Fe_2O_3$.

4. The device of claim 2 in which the material of said first body is $6Bi_2O_3$-$SiO_2$ and the material of said second body is selected from the group consisting of $12Bi_2O_3$-$Ga_2O_3$, $12Bi_2O_3$-$Fe_2O_3$ and $6Bi_2O_3$-$ZnO$.

5. The device of claim 2 in which the beam is launched into said second body to propagate in one of two polarization modes and including means disposed on one of the major surfaces of said second body for filtering out of said guided mode in said second body one of the two polarization modes of the beam.

6. The device of claim 5 in combination with means disposed between said beam launching means and said polarization filtering means for applying a spatially alternating electric field to said second body of a selected period to induce a spatially periodic variation in the refractive index of said second body in the direction of the propagation of the beam.

7. The device of claim 6 in which said electric field applying means comprises a pair of interdigital electrodes including a plurality of fingers formed on one of the major surfaces of said second body, the spacing and difference in potential between the adjacent fingers of said electrodes being sufficient to produce said periodic variation in refractive index of said second body.

8. The device of claim 7 in which the potential difference between the adjacent fingers of said electrodes is constant to provide a continuous switching from one polarization mode to another of the guided beam propagating in said second body.

9. The device of claim 7 in which the potential difference between the adjacent electrodes is varied to modulate the intensity of the guided beam passing through said polarization filtering means.

10. The device of claim 2 in which the monocrystalline sillenite composition of said second body is doped with suitable concentration of active ion to provide optical gain at the wavelength of the radiation propagating therein.

* * * * *

UNITED STATES PATENT OFFICE
CERTIFICATE OF CORRECTION

Patent No. 3,810,688      Dated May 14, 1974

Inventor(s) Albert Anthony Ballman and Ping King Tien

It is certified that error appears in the above-identified patent and that said Letters Patent are hereby corrected as shown below:

Assignee does not appear on patent and should be listed as follows:

Assignee: Bell Telephone Laboratories, Incorporated
                  Murray Hill, New Jersey Recorded May 21, 1973, Reel 2969, Frames 974 and 975.

Column 3, line 23, "optical" should read ---optional---.

Column 6, line 64, "$12BiO_2O_3-Ga_2O_3$" should read $$--12Bi_2O_3-Ga_2O_3--.$$

Signed and sealed this 19th day of November 1974.

(SEAL)
Attest:

McCOY M. GIBSON JR.          C. MARSHALL DANN
Attesting Officer            Commissioner of Patents